United States Patent
Chen et al.

(10) Patent No.: US 7,098,319 B2
(45) Date of Patent: Aug. 29, 2006

(54) DISAZO REACTIVE DYESTUFFS CONTAINING THE QUATERNARY GROUPS AND THEIR USE

(75) Inventors: Wen-Jang Chen, Jhongli (TW); Chien-Yu Chen, Lujhu Township (TW); Hsiao-San Chen, Lujhu Township (TW)

(73) Assignee: Everlight USA, Inc., Pineville, NC (US)

( * ) Notice: Subject to any disclaimer, the term of this patent is extended or adjusted under 35 U.S.C. 154(b) by 20 days.

(21) Appl. No.: 11/088,884

(22) Filed: Mar. 25, 2005

(65) Prior Publication Data

US 2006/0058515 A1   Mar. 16, 2006

(30) Foreign Application Priority Data

Sep. 16, 2004   (CN) .................. 2004100789381

(51) Int. Cl.
C09B 62/513   (2006.01)
(52) U.S. Cl. .................. 534/605; 534/612; 534/614
(58) Field of Classification Search .............. 534/605, 534/612, 614
See application file for complete search history.

(56) References Cited

U.S. PATENT DOCUMENTS

| 3,440,240 | A | * | 4/1969 | Kuhne et al. ............... 534/641 |
| 5,817,779 | A |   | 10/1998 | Deitz et al. ............... 534/637 |
| 5,998,590 | A | * | 12/1999 | Feeman et al. ............. 534/603 |

FOREIGN PATENT DOCUMENTS

| GB | 952123 | 3/1964 |
| GB | 1349168 | 3/1974 |

* cited by examiner

*Primary Examiner*—Fiona T. Powers
(74) *Attorney, Agent, or Firm*—Bacon & Thomas

(57) ABSTRACT

The present invention provides disazo reactive dyestuffs containing the quaternary group compounds of the general formula (1)

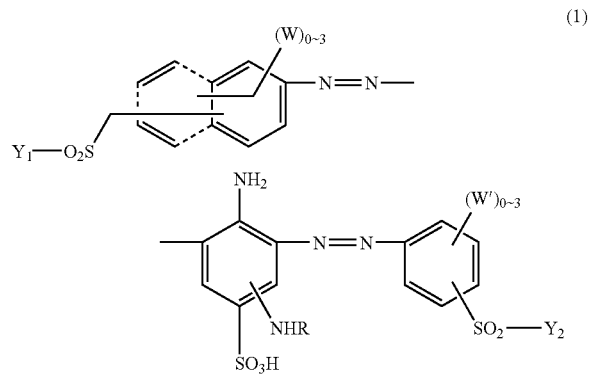

wherein R, $(W)_{0\sim3}$, $(W')_{0\sim3}$, $Y_1$ and $Y_2$ are defined the same as the specification. The dyes of the invention are distinguished by high fixation and a very good build-up. They are distinguished also by high washing off and a low nylon stain, and they have fiber-reactive properties and are very highly suitable for dyeing and printing of materials containing either cellulose fibers, such as cotton, synthetic cotton, hemp, and synthetic hemp, or amide containing fibers such as wool and nylon.

23 Claims, No Drawings

US 7,098,319 B2

DISAZO REACTIVE DYESTUFFS CONTAINING THE QUATERNARY GROUPS AND THEIR USE

BACKGROUND OF THE INVENTION

1. Field of the Invention

The present invention relates to a novel reactive dyestuff, more particularly to a disazo reactive dyestuff containing the quaternary group compounds that is highly suitable for dyeing and printing cellulose fibers.

2. Description of the Related Art

The British Patent No. 952,123 had disclosed a reactive dyestuff of the formula (A) below, however both the build up and fixation properties of the reactive dyestuff are poor.

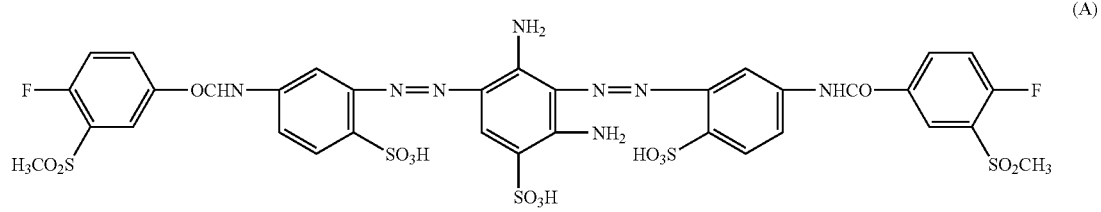

(A)

The British Patent No. 1,349,168 had disclosed a reactive dyestuff of the following formula (B), however the reactivity and the tinctorial yield of this reactive dyestuff are poor.

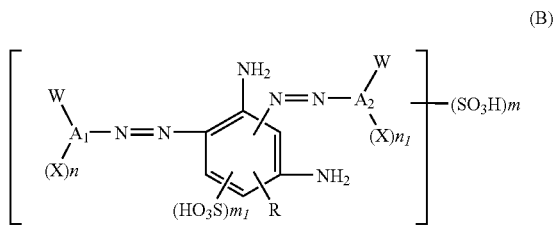

(B)

The U.S. Pat. No. 5,817,779 had disclosed a method for preparing compound of formula (C) and the dyeing applications thereof. The dyeing applications of compound of formula (C) consist of a higher reactivity as well as a good fixing capacity, however wash off properties are poor.

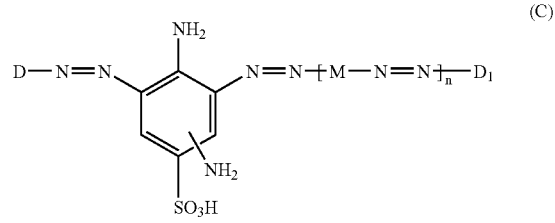

(C)

In the market, the quality of dyestuffs and the dyeing techniques used are economic, and particularly dyeing with reactive dyestuffs is even more demanding than before. Therefore, dyestuffs that improve over the previous properties, especially a novel reactive dyestuff that is applicable in industry is still demanding.

In the current dyeing applications, reactive dyestuffs that can sufficiently and easily wash off the unfixed parts are particularly preferred. As well the dyestuffs should also consist of good tictorial yield and high reactivity for a high fixation yield dyestuff to form. Sadly the known dyestuffs presently can not be satisfied the above essential qualities.

The purpose of the present invention is to come across the drawbacks for an improved novel reactive dyestuff that has superior qualities of the aforesaid, in addition applicable to dyeing and printing fiber materials.

The present inventor had widely researched on reactive dyestuffs to satisfy the aforesaid characteristics. It is discovered that the aforementioned problem can be resolved by incorporating a disazo reactive dyestuff containing the quaternary group such as pyridinio. The purpose of the quaternary group is to temporarily provides a high reactivity. Meanwhile the quaternary group has characteristics such as easy wash-off, biodegradable, good build-up capacity, high light fastness as well as wash fastness. In addition, by incorporating the quaternary group under other fastness tests also demonstrates fine performance, while having very good compatibility, fiber leveling, and on tone.

Other objects, advantages, and novel features of the invention will become more apparent from the following detailed description.

SUMMARY OF THE INVENTION

The present invention relates to a disazo reactive dyestuff containing the quaternary group compounds of the general formula (1) and their use,

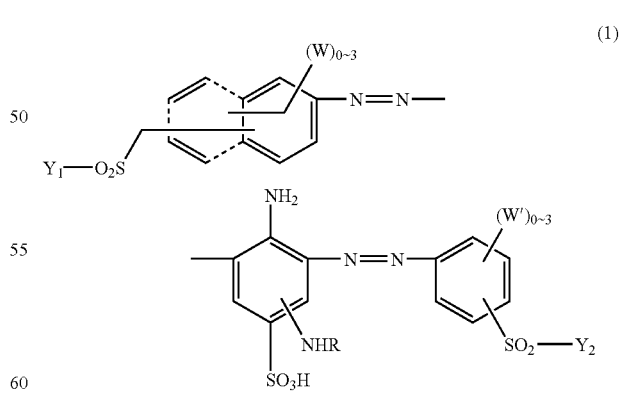

(1)

wherein R is hydrogen, $C_{1-4}$ alkyl-$SO_3H$ or $C_{1-4}$ alkyl-COOH; preferably R is hydrogen or $C_{1-4}$ alkyl-COOH; $(W)_{0-3}$ and $(W')_{0-3}$ are each independently of one another 0 to 3 identical or different radicals selected from the group consisting of sulfo, C1ot alkyl and $C_{1-4}$ alkoxyl; $(W)_{0-3}$ and $(W')_{0~3}$ are each independently of one another, preferably 0 to 3 identical or different radicals selected from the group consisting of sulfo, methyl and methoxy group; $Y_1$ and $Y_2$ are each independently of the other a radical of formula —CH=CH$_2$, —CH$_2$CH$_2$OSO$_3$H and —CH$_2$CH$_2$—U, and the $Y_1$ and $Y_2$ at least one is —CH$_2$CH$_2$—U; preferably $Y_1$ is —CH$_2$CH$_2$—U, $Y_2$ is —CH=CH$_2$ or —CH$_2$CH$_2$OSO$_3$H; and U is a radical of the following formula (2a), (2b), (2c), (2d), or (2e)

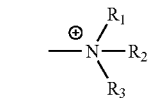
(2a)

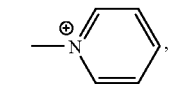
(2b)

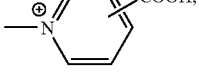
(2c)

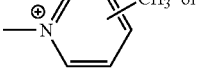
(2d)

(2e)

preferably U is a radical of the following formula (2b) or (2c)

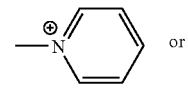
(2b)

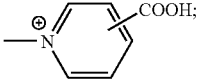
(2c)

$R_1$, $R_2$ and $R_3$ are each independently of the other $C_{1-4}$ alkyl; preferably $R_1$, $R_2$ and $R_3$ are methyl.

Disazo reactive dyestuffs containing the quaternary group compounds of the present invention of the general formula (1) can be presented in either acidic or salt form, particularly alkali metal and alkali earth metal. In applications alkali metal is preferred.

Preferably disazo reactive dyestuffs containing the quaternary group compounds of the present invention of the general formula (1) is the reactive dyestuffs of formula (1a) below.

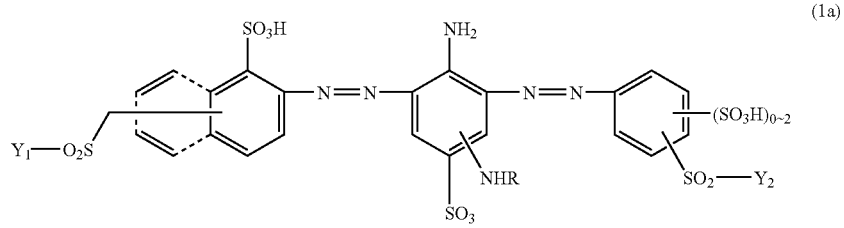
(1a)

wherein R, $Y_1$ and $Y_2$ are defined as above.

Most preferably, the disazo reactive dyestuffs containing the quaternary group compounds of the present invention of the general formula (1) is the reactive dyestuffs of formula (1b) below.

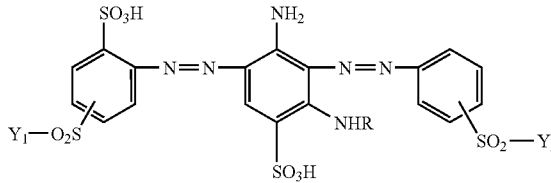
(1b)

wherein R, $Y_1$ and $Y_2$ are defined as above.

DETAILED DESCRIPTION OF THE PREFERRED EMBODIMENTS

The preparation of disazo reactive dyestuffs containing the quaternary group compounds of the present invention of the general formula (1) can be synthesized through known skills, such reactive dyestuffs of formula (1) can be prepared as the synthesis below.

In this synthesis, first amine compound of formula (a) showing below is proceeded with diazotization, which are then coupled with amine compound of formula (b) below in an acidic environment between pH=2–5

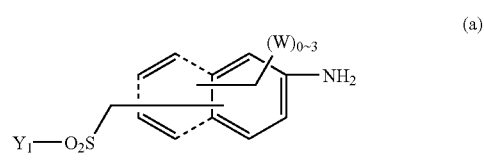
(a)

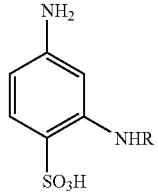 (b)

and a low temperature of 0–10° C. Subsequently it is further coupled with diazo salt of formula (c) below

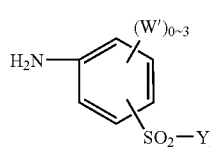 (c)

under a temperature of 20–60° C., while the pH is kept between weak acid and base (pH=4.0 to 8.0) to obtain the reactive dyestuffs of formula (1) of the present invention.

The sequence of the reactions of the aforementioned preparation method can also be modified. Compound of formula (c) and compound of formula (b) can first proceed with the reaction then further react with compound of formula (a). The same reactive dyestuffs of formula (1) are then obtained.

The aforementioned compound of formula (a) can be:

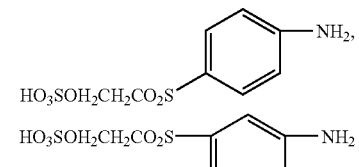

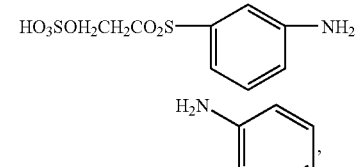

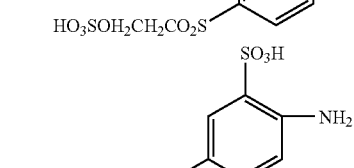

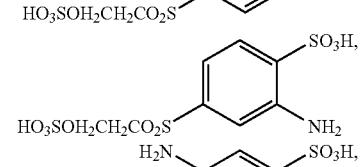

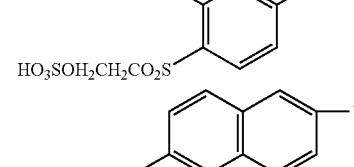

-continued

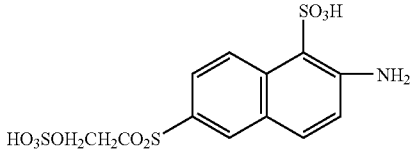

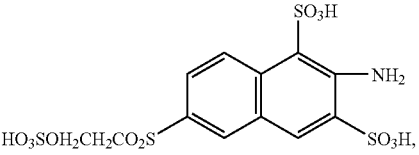

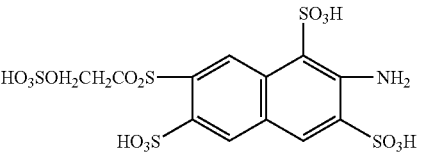

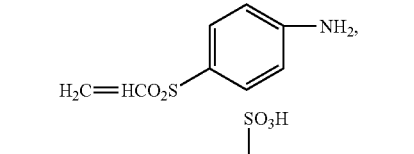

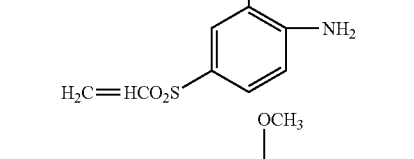

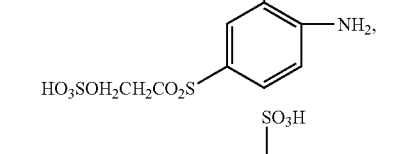

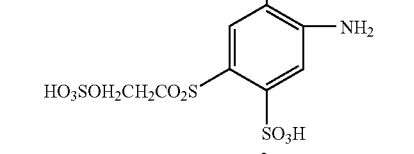

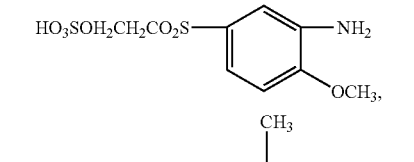

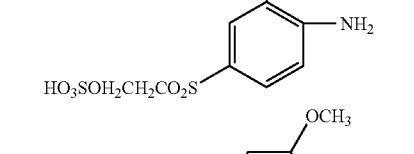

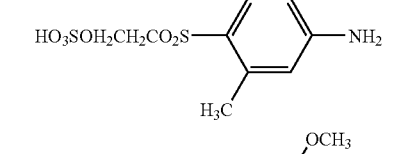

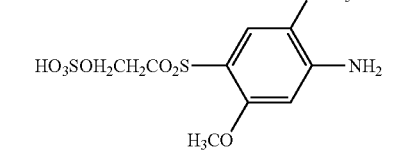

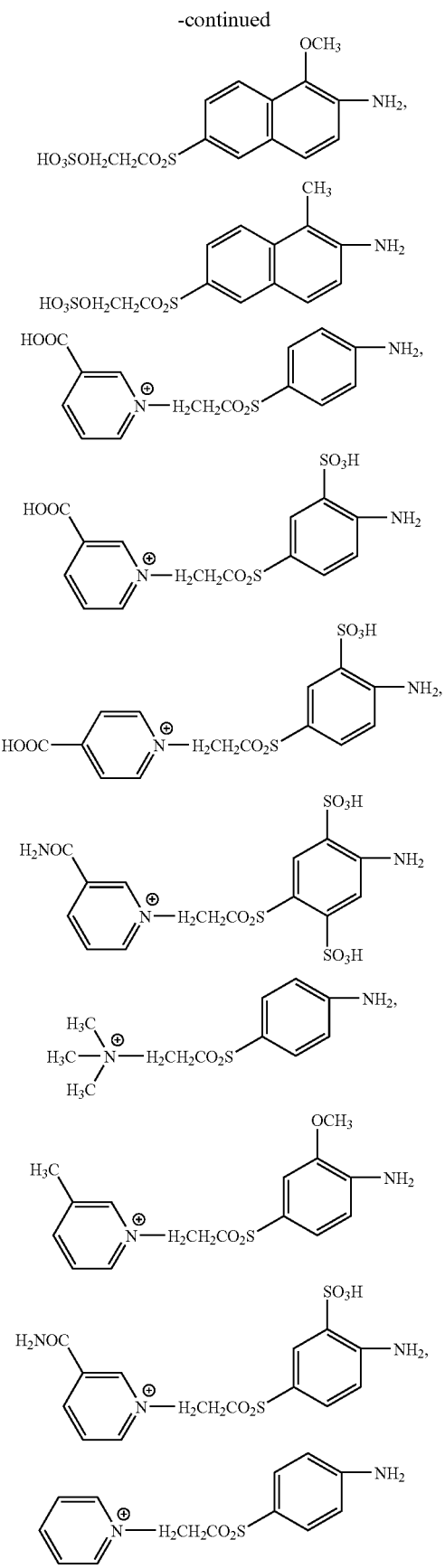
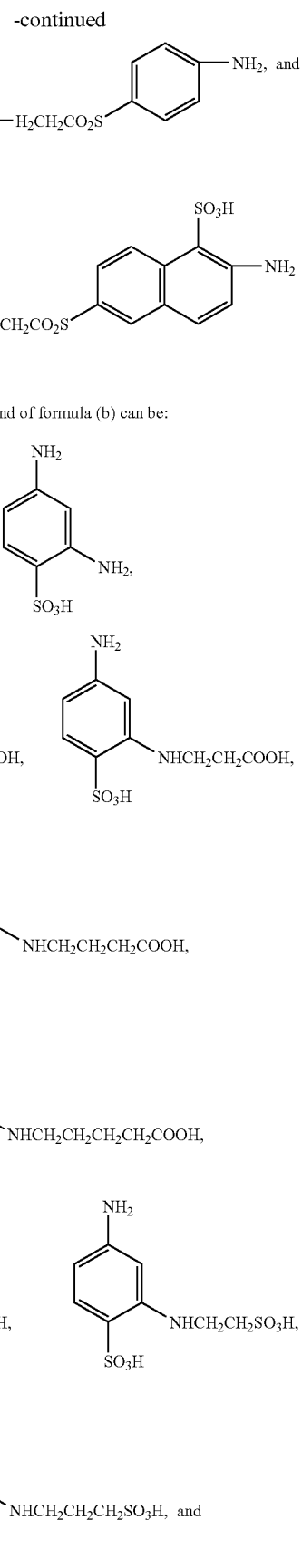
The aforementioned compound of formula (b) can be:

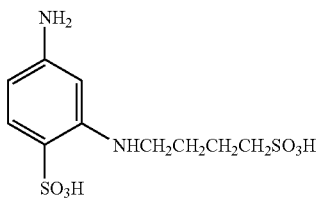
The aforementioned compound of formula (c) can be:
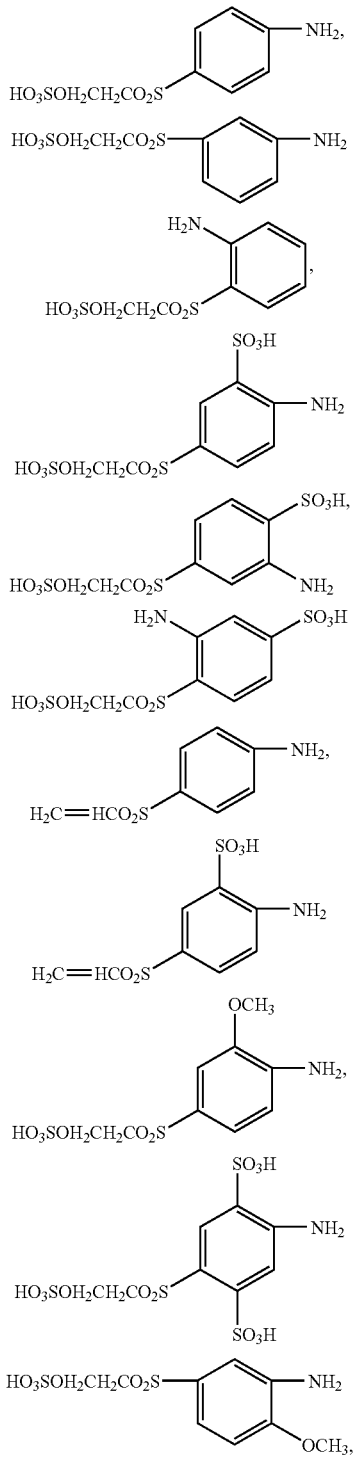
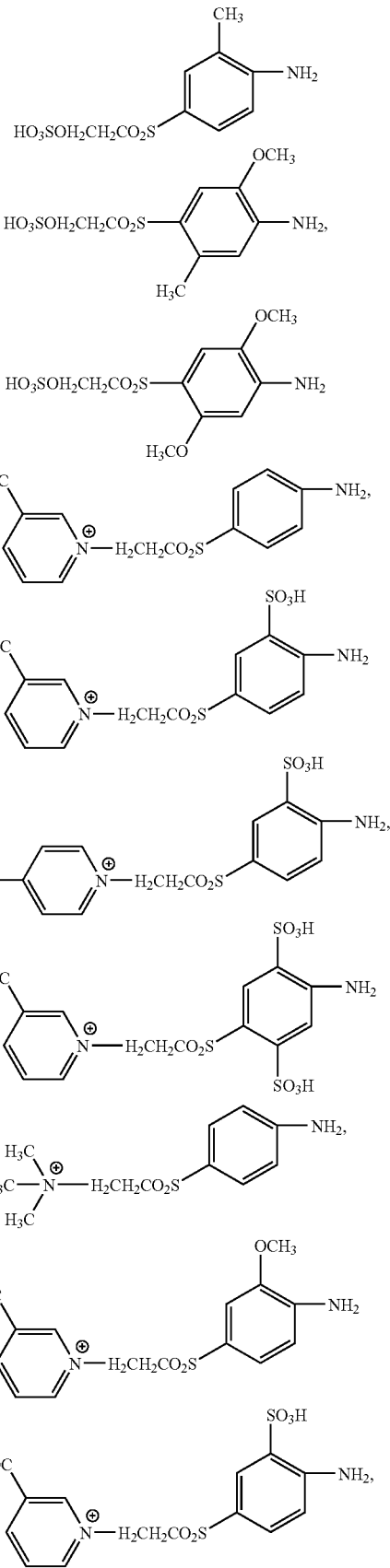

-continued

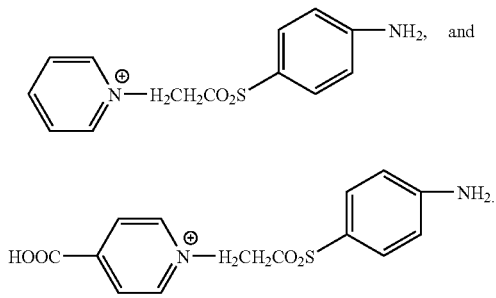

The dyestuff of the present invention can be produced by the above methods, reaction conditions are fully described in the above description. Known processes such as spray drying, precipitation, or filtration can purify the dyestuff of the present invention. They can be in the form of powder, granules, particle or liquid and an auxiliary reagent, for example, retarding agent, leveling agent, assistant agent, surfactant agent, or dispersing agent may be added.

The dyestuffs of the present invention all contain at least one anionic group, such as a sulfo group. For convenience they are expressed as free acid in the specification. When the dyestuffs of the present invention are manufactured, purified or used, they often exist in the form of water soluble salts, especially the alkaline metal salts, such as the sodium salt, lithium salt, potassium salt or ammonium salt, preferably sodium salt.

The dyestuffs of the present invention can be mixed each other to form a composition. The composition of the present invention can be prepared in several ways. For example, the dye components can be prepared separately and then mixed together to make powder, granular and liquid forms, or a number of individual dyes may be mixed according to the dyeing recipes in a dyehouse. The dye mixtures of the present invention can be prepared, for example, by mixing the individual dyes. The mixing process is carried out, for example, in a suitable mill, such as a ball mill or a pin mill, or kneaders or mixers.

The dyestuff according to the present invention can be applied to dye or print fiber materials, especially cellulose fiber or materials containing cellulose. All natural and regenerated cellulose fiber (e.g. cotton, linen, jute, ramie fiber, viscose rayon) or fiber materials containing cellulose are the materials to which the dyestuff of the present invention can be applied. The dyestuff according to the present invention is also suitable for dyeing or printing fibers, which contain hydroxyl groups and are contained in blended fabrics.

The dyestuff according to the present invention can be applied to the fiber material and fixed on the fiber in various ways, in particular in the form of aqueous dyestuff solutions and printing pastes. They can be applied to cellulose fibers by general dyeing methods, such as exhaustion dyeing, continuous dyeing, cold-pad-batch dyeing or printing that are commonly used in the dyeing of reactive dyestuffs.

The dyestuff according to the present invention is distinguishable from others by qualities such as decomposable, low salt, and low base, good fixing property and good build-up property. Nevertheless, the present invention also enhances the dye solubility with a high exhaustion. The dyes of the present invention can be applied in a wide range of dyeing temperature; therefore the dyes are also suitable for dyeing cotton and blending polyester fabrics. Printing can also be used with the dyestuff of the present invention. Printing is most suitable for cotton, blends of wool and silk, and T/C one-way bath dyeing.

The dyestuff according to the present invention exhibits superior substantivity, levelness, migration properties, and high fibers/dyes stability in acid/base in dyeing and printing cellulose fiber materials. Besides, the dyed cellulose fiber materials have good properties of light fastness, perspiration-light fastness, and wet fastness, e.g. clean fastness, water fastness, sea water fastness, cross-dyeing fastness, and perspiration fastness, as well as fastness of wrinkling, ironing, and chlorine bleaching.

Many examples have been used to illustrate the present invention. The examples sited below should not be taken as a limit to the scope of the invention. In these examples, the compounds are represented in the form of dissolved acid. However, in practice, they will exist as alkali salts for mixing and salts for dyeing.

In the following examples, quantities are given as parts by weight (%) if there is no indication. The relationship between weight parts and volume parts are the same as that between kilogram and liter.

EXAMPLE 1

36.1 parts of 1-aminobenzene-2-sulfonic acid-4-β-sulfatoethylsulfone are dissolved into 150 parts of ice water; subsequently the pH is adjusted to pH=13 with a solution of 45% sodium hydroxide, and the solution is stirred for 15 minutes to complete the reaction. The pH of the result solution is adjusted to pH=5.0–6.0 by adding a 32% HCl aqueous solution. After 12.7 parts of nicotinate are added, the solution is stirred at the temperature of 60° C. for 2 hours to complete the reaction. The solution is salted out with NaCl and filtered to obtain compound (P-1).

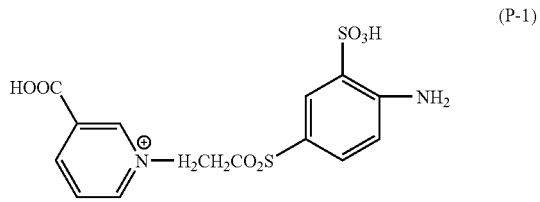

(P-1)

19.4 parts of compound (P-1) are dissolved into 150 parts of ice water, and 12.6 parts of 32% HCl aqueous solution are further added and stirred evenly. Subsequently the reacting solution undergoes diazotization by the addition of 3.7 parts sodium nitrite aqueous solution in a temperature of 0 to 5° C. To this mixture, 9.5 parts of powdered 2,4-diaminobenzenesulphonic acid are then added, and the pH is adjusted gradually to pH=3.5 by the addition of sodium bicarbonate. Under room temperature the mixture is stirred till coupling reaction has completed. In addition, the reacting solution is further subjected to 14.1 parts of 1-aminobenzene-4-β-sulfatoethylsulfone, and the pH is again adjusted gradually to 5.0–6.0 by the addition of soda ash, the mixture is stirred till reaction is completed. The result solution is salted out with NaCl and filtered to obtain compound (3).

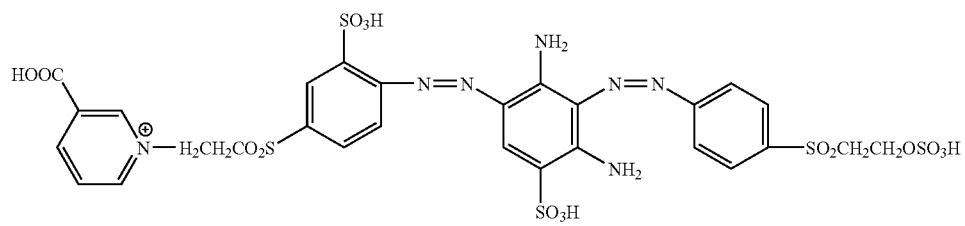

(3)

EXAMPLE 2

20.6 parts of 2-aminonaphthalene-1-sulfonic acid-6-β-sulfatoethylsulfone are dispersed in 150 parts of ice water, and 12.6 parts of 32% HCl aqueous solution is further added and stirred evenly. Subsequently the reacting solution undergoes diazotization by the addition of 3.6 parts sodium nitrite aqueous solution in a temperature of 0 to 5° C. To this mixture, 9.5 parts of powdered 2,4-diaminobenzenesulphonic acid are added, and the pH is adjusted gradually to 3.5 by the addition of sodium bicarbonate. Under room temperature the mixture is stirred till coupling reaction has completed. Upon the reaction is completed, the temperature is dropped to 0° C. by the addition of ice. Then, the pH is adjusted to pH=13 with a solution of 45% sodium hydroxide, and the solution is stirred for 15 minutes; then 32% HCl aqueous solution is stirred into so that the pH is further adjusted to 5.0–6.0. To this mixture, 6.4 parts of nicotinate are added and stirred in the presence of heat for 2 hours while the temperature is maintained at 60° C. throughout for the reaction to complete. Then, the temperature is set to 20° C.

EXAMPLE 3

19.4 parts of compound (P-1) are prepared and dissolved in 150 parts of ice water, and 12.6 parts of 32% HCl aqueous solution is further added into and mixed thoroughly. Subsequently the reacting solution undergoes diazotization by the addition of 3.7 parts sodium nitrite aqueous solution in a temperature of 0 to 5° C. To this mixture, 9.5 parts of powdered 2,4-diaminobenzenesulphonic acid are added, and the pH is adjusted gradually to 3.5 by the addition of sodium bicarbonate. Under room temperature the mixture is stirred till coupling reaction has completed. The diazonium salt of 1-Aminobenzene-4-β-nicotinicethylsulfone (15.4 parts) is added into the above result solution, and the pH is again adjusted gradually to 5.0–6.0 by the addition of soda ash. The mixture is stirred till reaction is completed. The result solution is salted out with NaCl and filtered to obtain compound (5).

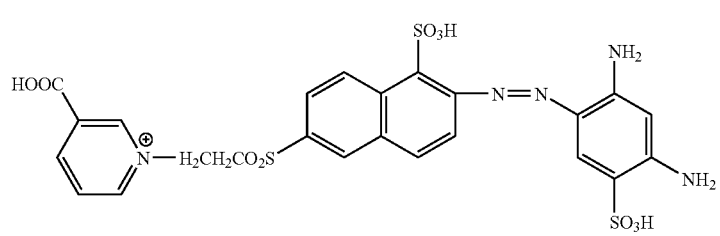

(P-2)

The diazonium salt of 1-aminobenzene-4-β-sulfatoethylsulfone (14.1 parts) is added into the above result solution, and the pH is again adjusted gradually to 5.0–6.0 by the addition of soda ash. The mixture is stirred till reaction is completed. The result solution is salted out with NaCl and filtered to obtain compound (4).

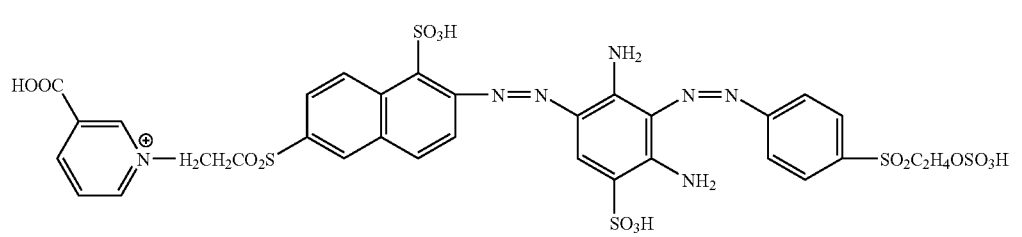

(4)

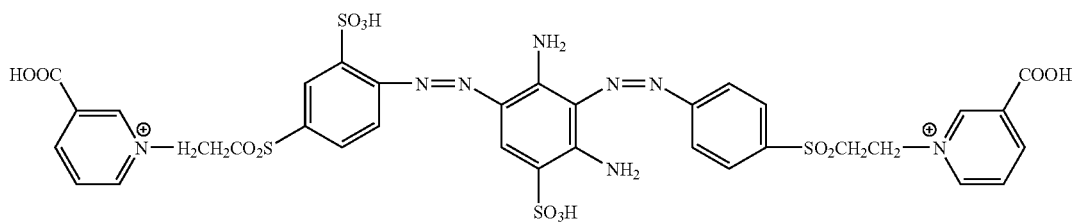

(5)

EXAMPLE 4

14.1 parts of 1-aminobenzene-3-β-sulfatoethylsulfone are prepared and dissolved in 150 parts of ice water, and 12.6 parts of 32% HCl aqueous solution is further added into and stirred thoroughly. Subsequently the reacting solution undergoes diazotization by the addition of 3.6 parts sodium nitrite aqueous solution in a temperature of 0 to 5° C. To this mixture, 9.5 parts of powdered 2,4-diaminobenzenesulphonic acid are added, and the pH is adjusted gradually to 3.5 by the addition of sodium bicarbonate. Under room temperature the mixture is stirred till coupling reaction has completed. The diazonium salt of 1-Aminobenzene-4-β-nicotinicethylsulfone (15.4 parts) is added into the above result solution, and the pH is again adjusted gradually to 5.0–6.0 by the addition of soda ash. The mixture is stirred till reaction is completed. The result solution is salted out with NaCl and filtered to obtain compound (6).

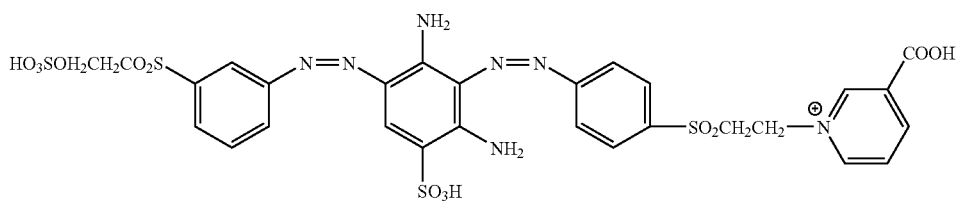

(6)

EXAMPLES 5 TO 19

Generally, with accordance to the procedures of example 1, example 2, example 3 and example 4, the reactive dyestuffs below can be prepared, and upon dyeing with specific dyestuffs, cotton fiber demonstrates fine fastness.

EXAMPLE 5

A golden yellow compound of the following formula (7) is obtained.

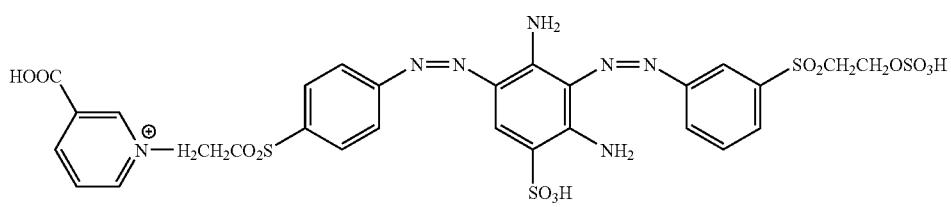

(7)

EXAMPLE 6
An orange compound of the following formula (8) is obtained.
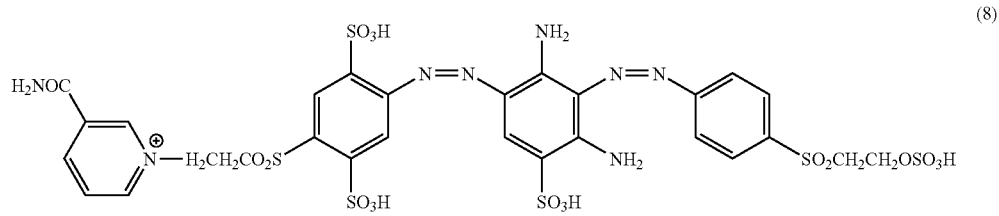
(8)
EXAMPLE 7
An orange compound of the following formula (9) is obtained.
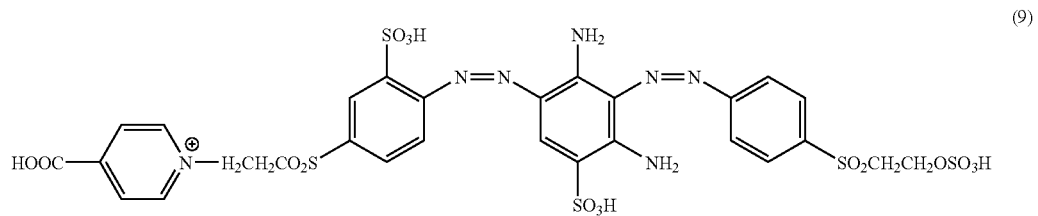
(9)
EXAMPLE 8
An orange compound of the following formula (10) is obtained.
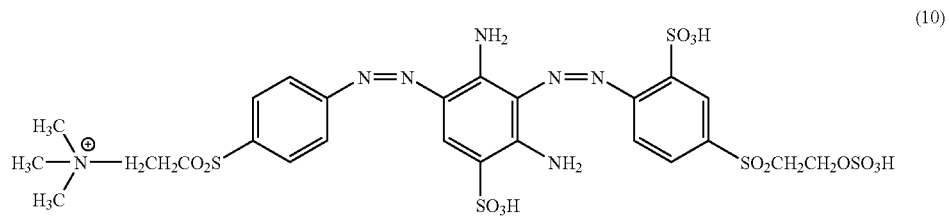
(10)
EXAMPLE 9
An orange compound of the following formula (11) is obtained.
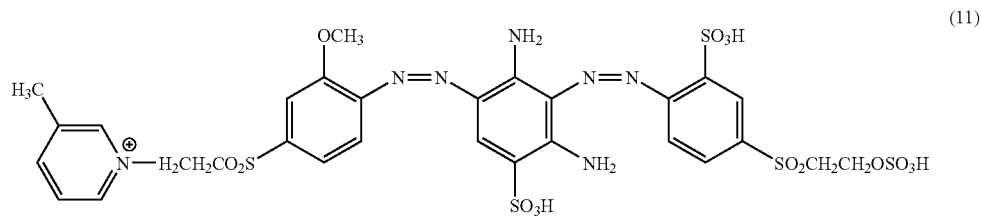
(11)

EXAMPLE 10
An orange compound of the following formula (12) is obtained.
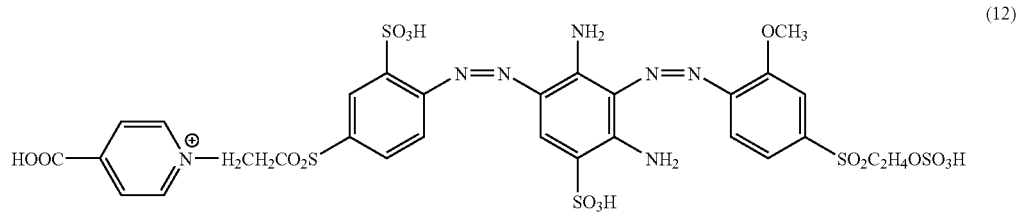
(12)
EXAMPLE 11
An orange compound of the following formula (13) is obtained.
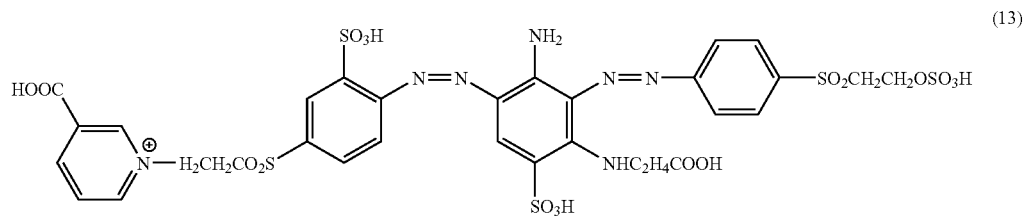
(13)
EXAMPLE 12
An orange compound of the following formula (14) is obtained.
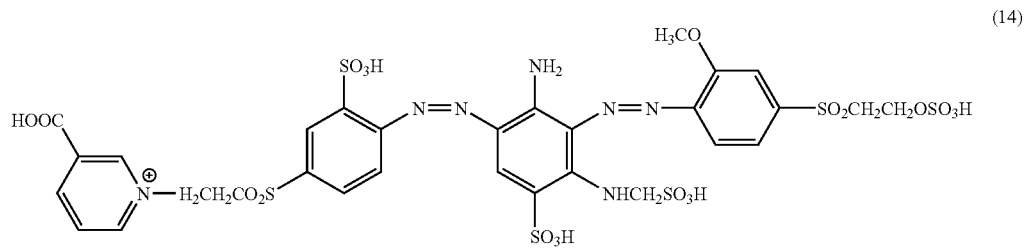
(14)
EXAMPLE 13
An orange compound of the following formula (15) is obtained.
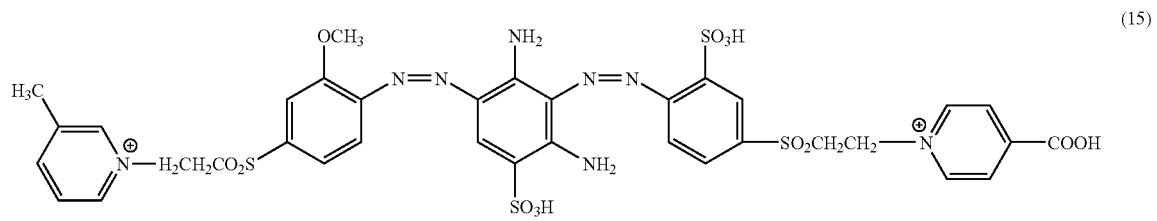
(15)

EXAMPLE 14
An orange compound of the following formula (16) is obtained.
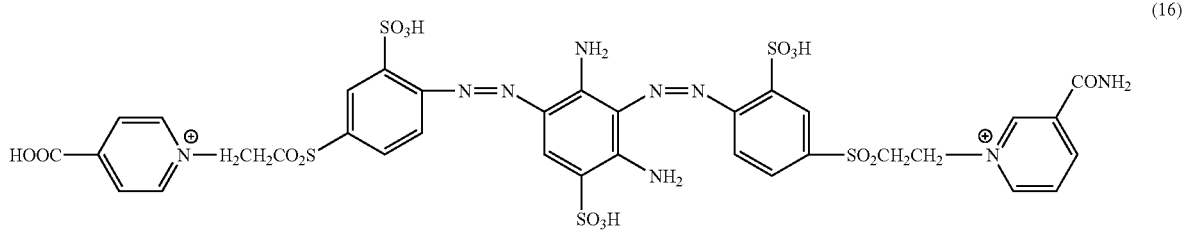
(16)
EXAMPLE 15
An orange compound of the following formula (17) is obtained.
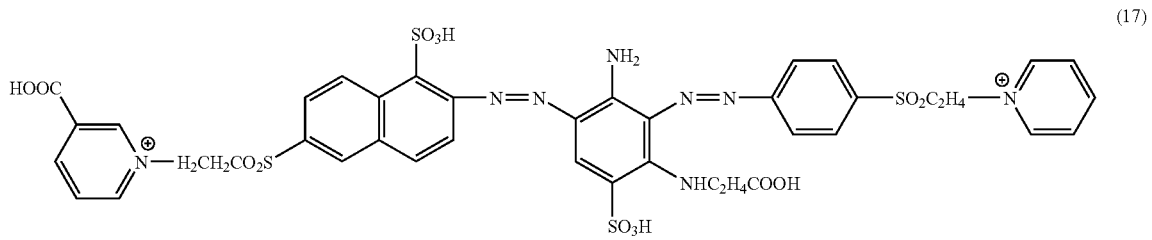
(17)
EXAMPLE 16
An orange compound of the following formula (18) is obtained.
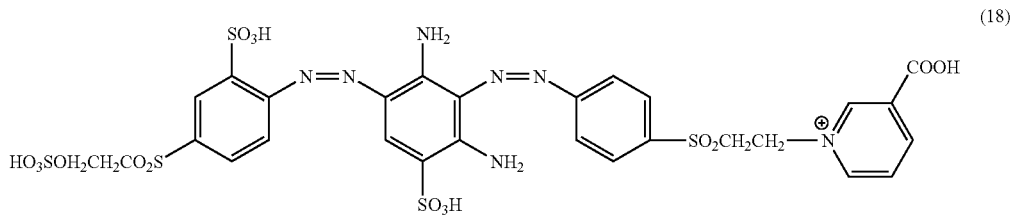
(18)
EXAMPLE 17
An orange compound of the following formula (19) is obtained.
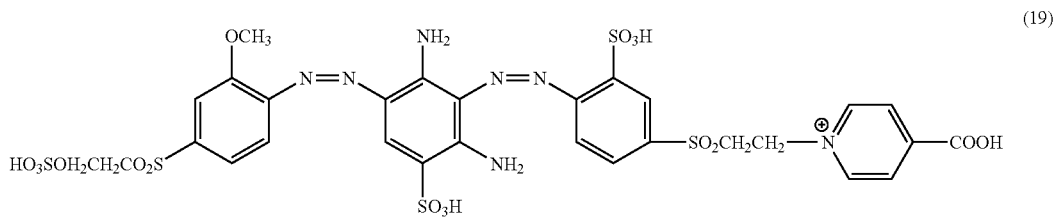
(19)

EXAMPLE 18

An orange compound of the following formula (20) is obtained.

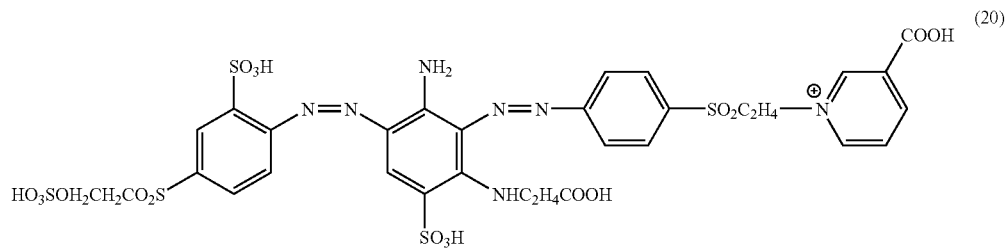

EXAMPLE 19

An orange compound of the following formula (21) is obtained.

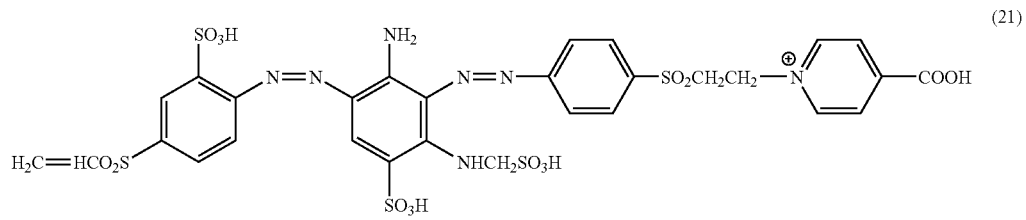

EXAMPLE 20

Urea 100 parts, reduction retarding agent 10 parts, sodium bicarbonate 20 parts, sodium alginate 55 parts, warm water 815 parts, were stirred in a vessel to give a completely homogeneous printing paste.

Dyestuff of formula (3) (prepared as in example 1), 3 parts, and the above printing paste, 100 parts, were mixed together to make a homogeneous colored paste. A 100 mesh printing screen covering an adequate sized piece of cotton fabric was painted with this colored paste on printing screen to give a colored fabric.

The colored fabric was placed in an oven at 65° C. to dry for 5 minutes then taken out, and put into a steam oven using saturated steam for 10 minutes at 102–105° C.

The colored fabric was washed with cold water, hot water, and soap then dried to obtain an orange fabric with good dyeing properties.

EXAMPLE 21

Dyestuff of formula (3) (prepared from the example 1), 3 parts was dissolved in 100 parts of water to give a padding liquor. 25 ml of alkali solution (NaOH (38°Be') 15 ml/l and Glauber's salt 30 parts/l) were added to the padding liquor. The resultant solution was put into a pad roller machine. The cotton fabric was padded by the roller pad machine, then was batched for 4 hours. The padded fabric was washed with cold water, hot water, and soap solution then dried to obtain an orange fabric with good dyeing properties.

EXAMPLE 22

Dyestuff of formula (3) (prepared from the example 1), 0.25 parts was dissolved in 250 parts of water. To 40 ml of this solution, in a dyeing bottle, was added cotton fabric, Glauber's salt, 2.4 parts, and 32% alkali solution, 2.5 parts. The dyeing bottle was shaken at 60° C. for 60 minutes. The colored fabric was washed with cold water, hot water, and soap solution then dried to obtain an orange fabric with good dyeing properties.

EXAMPLE 23

Dyestuff of formula (4) (prepared from the example 2), 0.25 parts was dissolved in 250 parts of water. To 40 ml of this solution, in a dyeing bottle, was added cotton fabric, Glauber's salt, 2.4 parts, and 32% alkali solution, 2.5 parts. The dyeing bottle was shaken at 60° C. for 60 minutes. The colored fabric was washed with cold water, hot water, and soap solution then dried to obtain an orange fabric with good dyeing properties.

EXAMPLE 24

Dyestuff of formula (5) (prepared from the example 3), 0.25 parts was dissolved in 250 parts of water. To 40 ml of this solution, in a dyeing bottle, was added cotton fabric, Glauber's salt, 2.4 parts, and 32% alkali solution, 2.5 parts. The dyeing bottle was shaken at 60° C. for 60 minutes. The colored fabric was washed with cold water, hot water, and soap solution then dried to obtain an orange fabric with good dyeing properties.

EXAMPLE 25

Dyestuff of formula (6) (prepared from the example 4), 0.25 parts was dissolved in 250 parts of water. To 40 ml of this solution, in a dyeing bottle, was added cotton fabric, Glauber's salt, 2.4 parts, and 32% alkali solution, 2.5 parts. The dyeing bottle was shaken at 60° C. for 60 minutes. The colored fabric was washed with cold water, hot water, and soap solution then dried to obtain a golden yellow fabric with good dyeing properties.

The series of disazo reactive dyestuffs containing the quaternary groups of the present invention are suitable for common uses and have excellent properties. They can be used to dye cellulose fibers with various dyeing methods, such as exhaustion dyeing, printed-dyeing, or continuous dyeing that are commonly used in the dyeing of reactive dyestuffs.

The series of disazo reactive dyestuffs containing the quaternary groups of the present invention are universal dye mixtures, suitable for the dyeing of cellulose fiber materials; in application it can be use as common reactive dyes, such as in exhaust dyeing, printing, and continuous dyeing. Moreover, the product dyed with the dyestuffs exhibit superior properties.

The series of disazo reactive dyestuffs containing the quaternary groups of the present invention are economically valued because they are water-soluble, which provides the products with excellent dyeing properties, especially in wash-off, build up, leveling wash, light, rubbing, ironing, and chlorine bleaching fastness.

Although the present invention has been explained in relation to its preferred embodiment, it is to be understood that many other possible modifications and variations can be made without departing from the scope of the invention as hereinafter claimed.

What is claimed is:

1. A disazo reactive dyestuff of the following formula (1),

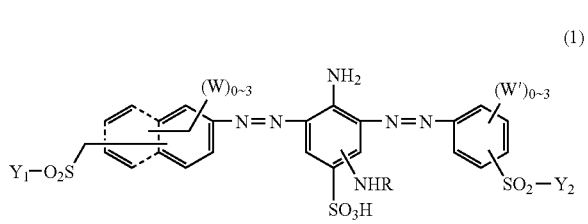

wherein
R is hydrogen, $C_{1-4}$ alkyl-$SO_3H$ or $C_{1-4}$ alkyl-COOH;
$(W)_{0-3}$ and $(W')_{0-3}$ are each independently of one another 0 to 3 identical or different radicals selected from the group consisting of sulfo, $C_{1-4}$ alkyl and $C_{1-4}$ alkoxyl;
$Y_1$ and $Y_2$ are each independently of the other a radical of formula —CH=$CH_2$, —$CH_2CH_2OSO_3H$ or —$CH_2CH_2$—U, and at least one of the $Y_1$ and $Y_2$ is —$CH_2CH_2$—U, and U is a radical of the following formula (2a), (2b), (2c), (2d), or (2e)

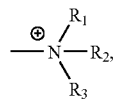
(2a)

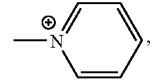
(2b)

(2c)

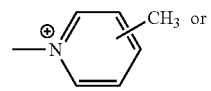
(2d)

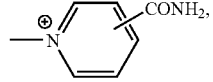
(2e)

wherein $R_1$, $R_2$ and $R_3$ are each independently of the other $C_{1-4}$ alkyl.

2. The disazo reactive dyestuff of the claim 1, wherein R is hydrogen or $C_{1-4}$ alkyl-COOH.

3. The disazo reactive dyestuff of the claim 1, wherein $(W)_{0-3}$ and $(W')_{0-3}$ are each independently of one another 0 to 3 identical or different radicals selected from the group consisting of sulfo, methyl and methoxy group.

4. The disazo reactive dyestuff of the claim 1, wherein $R_1$, $R_2$ and $R_3$ are methyl.

5. The disazo reactive dyestuff of the claim 1, wherein U is a radical of formula (2b) or (2c)

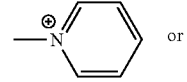
(2b)

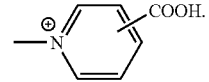
(2c)

6. The disazo reactive dyestuff of the claim 1, wherein $Y_1$ is —$CH_2CH_2$—U, $Y_2$ is —CH=$CH_2$ or —$CH_2CH_2OSO_3H$.

7. The disazo reactive dyestuff of the claim 6, wherein U is a radical of formula (2b) or (2c)

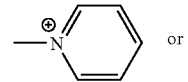
(2b)

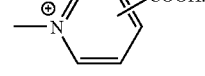
(2c)

8. The disazo reactive dyestuff of the claim 1, wherein the formula (1) is the reactive dyestuff of formula (1a),

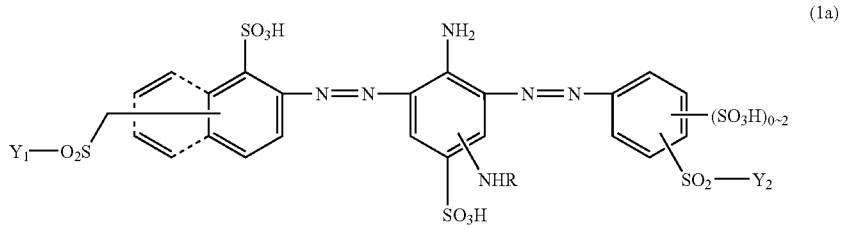

(1a)

wherein
R is hydrogen, —$C_{1-4}$ alkyl-$SO_3H$ or —$C_{1-4}$ alkyl-COOH;
$Y_1$ and $Y_2$ are each independently of the other a radical of formula —$CH=CH_2$, —$CH_2CH_2OSO_3H$ or —$CH_2CH_2$—U, and at least one of the $Y_1$ and $Y_2$ is —$CH_2CH_2$—U, and U is a radical of the following formula (2a), (2b), (2c), (2d), or (2e)

(2a)

(2b)

(2c)

(2d)

(2e)

wherein $R_1$, $R_2$ and $R_3$ are each independently of the other $C_{1-4}$ alkyl.

9. The disazo reactive dyestuff of the claim 8, wherein R is hydrogen or $C_{1-4}$ alkyl-COOH.

10. The disazo reactive dyestuff of the claim 8, wherein $R_1$, $R_2$ and $R_3$ are methyl.

11. The disazo reactive dyestuff of the claim 8, wherein U is a radical of the following formula (2b) or (2c)

(2b)

(2c)

12. The disazo reactive dyestuff of the claim 8, wherein $Y_1$ is —$CH_2CH_2$—U, $Y_2$ is —$CH=CH_2$ or —$CH_2CH_2OSO_3H$.

13. The disazo reactive dyestuff of the claim 12, wherein U is a radical of the following formula (2b) or (2c)

(2b)

(2c)

14. The disazo reactive dyestuff of the claim 8, wherein the formula (1a) is the following formula (4)

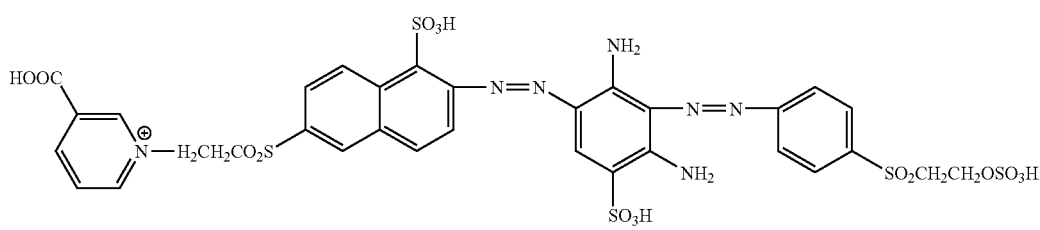

(4)

15. The disazo reactive dyestuff of the claim 1, wherein the formula 1 is the following formula (1b)

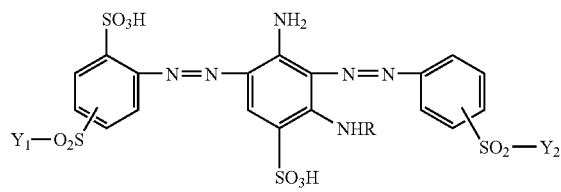
(1b)

wherein

R is hydrogen, $C_{1-4}$alkyl-$SO_3H$ or $C_{1-4}$ alkyl-COOH;

$Y_1$ and $Y_2$ are each independently of the other a radical of formula —CH=$CH_2$, —$CH_2CH_2OSO_3H$ or —$CH_2CH_2$—U, and at least one of the $Y_1$ and $Y_2$ is —$CH_2CH_2$—U, and U is a radical of the following formula (2a), (2b), (2c), (2d), or (2e)

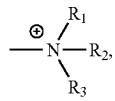
(2a)

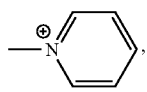
(2b)

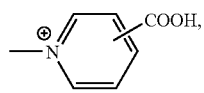
(2c)

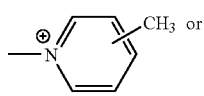
(2d)

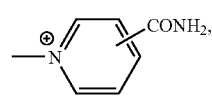
(2e)

wherein $R_1$, $R_2$ and $R_3$ are each independently of the other $C_{1-4}$ alkyl.

16. The disazo reactive dyestuff of the claim 15, wherein R is hydrogen or $C_{1-4}$ alkyl-COOH.

17. The disazo reactive dyestuff of the claim 15, wherein $R_1$, $R_2$ and $R_3$ are methyl.

18. The disazo reactive dyestuff of the claim 15, wherein U is a radical of the following formula (2b) or (2c)

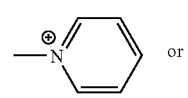
(2b)

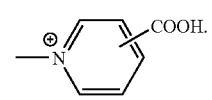
(2c)

19. The disazo reactive dyestuff of the claim 15, wherein $Y_1$ is —$CH_2CH_2$—U, $Y_2$ is —CH=$CH_2$ or —$CH_2CH_2OSO_3H$.

20. The disazo reactive dyestuff of the claim 19, wherein U is a radical of the following formula (2b) or (2c)

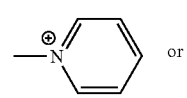
(2b)

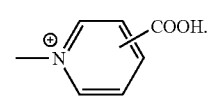
(2c)

21. The disazo reactive dyestuff of the claim 15, wherein the formula (1b) is a reactive dyestuff of the following formula (3)

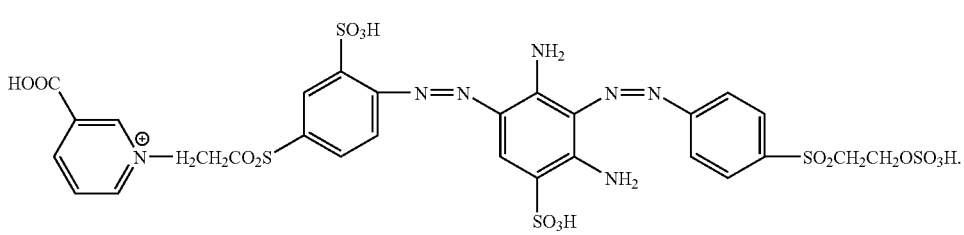
(3)

22. The disazo reactive dyestuff of the claim 15, wherein the formula (1b) is a reactive dyestuff of the following formula (5)
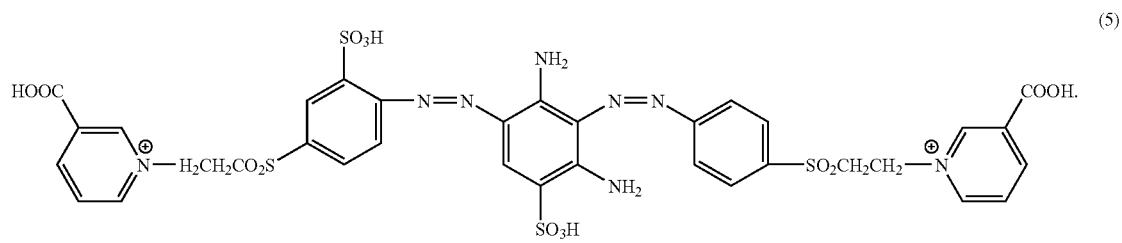
(5)
23. The disazo reactive dyestuff of the claim 15, wherein the formula (1b) is a reactive dyestuff of the following formula (18)
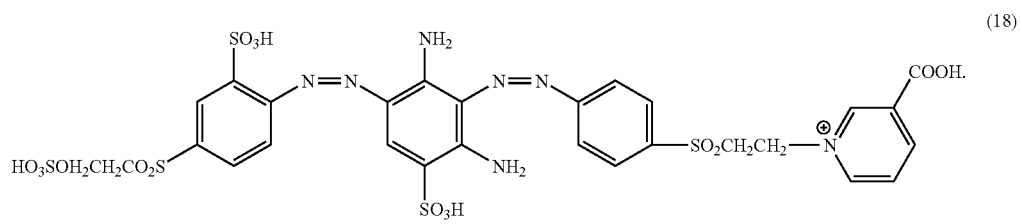
(18)
* * * * *